(12) United States Patent
Saxena et al.

(10) Patent No.: US 12,705,992 B2
(45) Date of Patent: Aug. 11, 2026

(54) AIRCRAFT COLLISION AVOIDANCE SYSTEM

(71) Applicant: HONEYWELL INTERNATIONAL INC., Charlotte, NC (US)

(72) Inventors: Sunit Kumar Saxena, Urbana, OH (US); William Tyson, III, Urbana, OH (US); Richard Policy, Urbana, OH (US); Anita Sure, Bangalore (IN); Ritu Rai, Bangalore (IN); Deepak Bhimrao Mahajan, Bangalore (IN); Gowtham Kumar Vankayala, Bangalore (IN)

(73) Assignee: HONEYWELL AEROSPACE US LLC, Phoenix, AZ (US)

( * ) Notice: Subject to any disclaimer, the term of this patent is extended or adjusted under 35 U.S.C. 154(b) by 181 days.

(21) Appl. No.: 18/632,575

(22) Filed: Apr. 11, 2024

(65) Prior Publication Data

US 2025/0391281 A1 Dec. 25, 2025

(51) Int. Cl.
*G08G 5/80* (2025.01)
*B64D 47/02* (2006.01)
*G08G 5/54* (2025.01)

(52) U.S. Cl.
CPC ............... *G08G 5/80* (2025.01); *B64D 47/02* (2013.01); *G08G 5/54* (2025.01)

(58) Field of Classification Search
None
See application file for complete search history.

(56) References Cited

U.S. PATENT DOCUMENTS 9,047,771 B1 6/2015 Thoreen et al.
9,889,948 B2 2/2018 Hessling von Heimendahl et al.
2005/0007257 A1 1/2005 Rast
2013/0321169 A1 12/2013 Bateman et al.
2015/0142214 A1* 5/2015 Cox .................... G05D 1/0083 701/3
2015/0206438 A1* 7/2015 Marsden ................. G08G 5/80 701/301
2017/0210282 A1* 7/2017 Rodriguez Barros . B60Q 1/324
2018/0032210 A1* 2/2018 Cutu ......................... G06T 7/11
2021/0150922 A1 5/2021 Kanagarajan et al.
2022/0196845 A1 6/2022 Jordan et al.
2022/0258881 A1 8/2022 Jha et al.
2025/0087102 A1* 3/2025 Katz ....................... G08G 5/54

FOREIGN PATENT DOCUMENTS

EP 2801528 B1 7/2018
EP 4063278 A1 9/2022

* cited by examiner

*Primary Examiner* — Abdhesh K Jha
*Assistant Examiner* — David Hatch
(74) *Attorney, Agent, or Firm* — Ingrassia, Fisher & Lorenz LLP

(57) ABSTRACT

A collision avoidance system is provided for an aircraft that includes a fuselage and a plurality of aircraft surfaces coupled to and extending from the fuselage. The collision avoidance system includes a light engine that is mounted on at least one of the aircraft surfaces and is configured, upon being energized, to emit a light beam in one or more directions. The light engine is further configured such that, when the light beam is emitted, it creates a light plane that is disposed at a predetermined angle relative to a ground surface on which the aircraft is located and extends, from the aircraft surface, along the ground surface thereby producing an elongated light pattern on the ground surface and on any obstacle that the light plane encounters.

18 Claims, 15 Drawing Sheets

AIRCRAFT COLLISION AVOIDANCE SYSTEM

CROSS REFERENCE TO RELATED APPLICATION

This application claims priority to India Provisional Patent Application No. 202411007115, filed Feb. 2, 2024, the entire content of which is incorporated by reference herein.

TECHNICAL FIELD

The present disclosure generally relates to aircraft, and more particularly relates to a light engine aircraft collision avoidance system.

BACKGROUND

A recent study showed the occurrence of an undesirable number of wing or wingtip collision incidents while aircraft are on the ground. Care is always needed during ground maneuvering, but especially with relatively large aircraft that have swept wings. With these aircraft, the wingtips are often not visible from the flight deck and are subject to "swept wing growth" or "wing creep, thereby increasing the risk of wing or wingtip collision incidents.

Hence, there is a need for a cost-effective collision avoidance system. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a collision avoidance system is provided for an aircraft that includes a fuselage and a plurality of aircraft surfaces coupled to and extending from the fuselage. The collision avoidance system includes a light engine that is mounted on at least one of the aircraft surfaces and is configured, upon being energized, to emit a light beam in one or more directions. The light engine is further configured such that, when the light beam is emitted, it creates a light plane that is disposed at a predetermined angle relative to a ground surface on which the aircraft is located and extends, from the aircraft surface, along the ground surface thereby producing an elongated light pattern on the ground surface and on any obstacle that the light plane encounters.

In another embodiment, a collision avoidance system is provided for an aircraft that includes a fuselage and a plurality of aircraft surfaces coupled to and extending from the fuselage. The collision avoidance system includes a laser light source that is mounted on at least one of the aircraft surfaces and is configured, upon being energized, to emit a laser light beam in one or more directions. The laser light source is further configured such that, when the laser light beam is emitted, it creates a laser light plane that is disposed at a predetermined angle relative to a ground surface on which the aircraft is located and extends, from the aircraft surface, along the ground surface thereby producing an elongated laser light pattern on the ground surface and on any obstacle that the light plane encounters.

In yet another embodiment, a collision avoidance system is provided for an aircraft that includes a fuselage and a plurality of aircraft surfaces coupled to and extending from the fuselage. The collision avoidance system includes a light engine, an object detector, and a processing system. The light engine is mounted on at least one of the aircraft surfaces and is configured, upon being energized, to emit a light beam in one or more directions. The light engine is further configured such that, when the light beam is emitted, it creates a light plane that is disposed at a predetermined angle relative to a ground surface on which the aircraft is located and extends, from the aircraft surface, along the ground surface thereby producing an elongated light pattern on the ground surface and on any obstacle that the light plane encounters. The object detector is coupled to the aircraft and is configured to detect one or more collision threats within a predetermined distance of the aircraft. The processing system is in operable communication with light engine and the object detector. The processing system is configured to determine when a collision threat is within the predetermined distance of the aircraft and energize the light engine to emit the light beam in a predetermined color and/or pattern when a collision threat is within the predetermined distance of the aircraft.

Furthermore, other desirable features and characteristics of the collision warning system will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
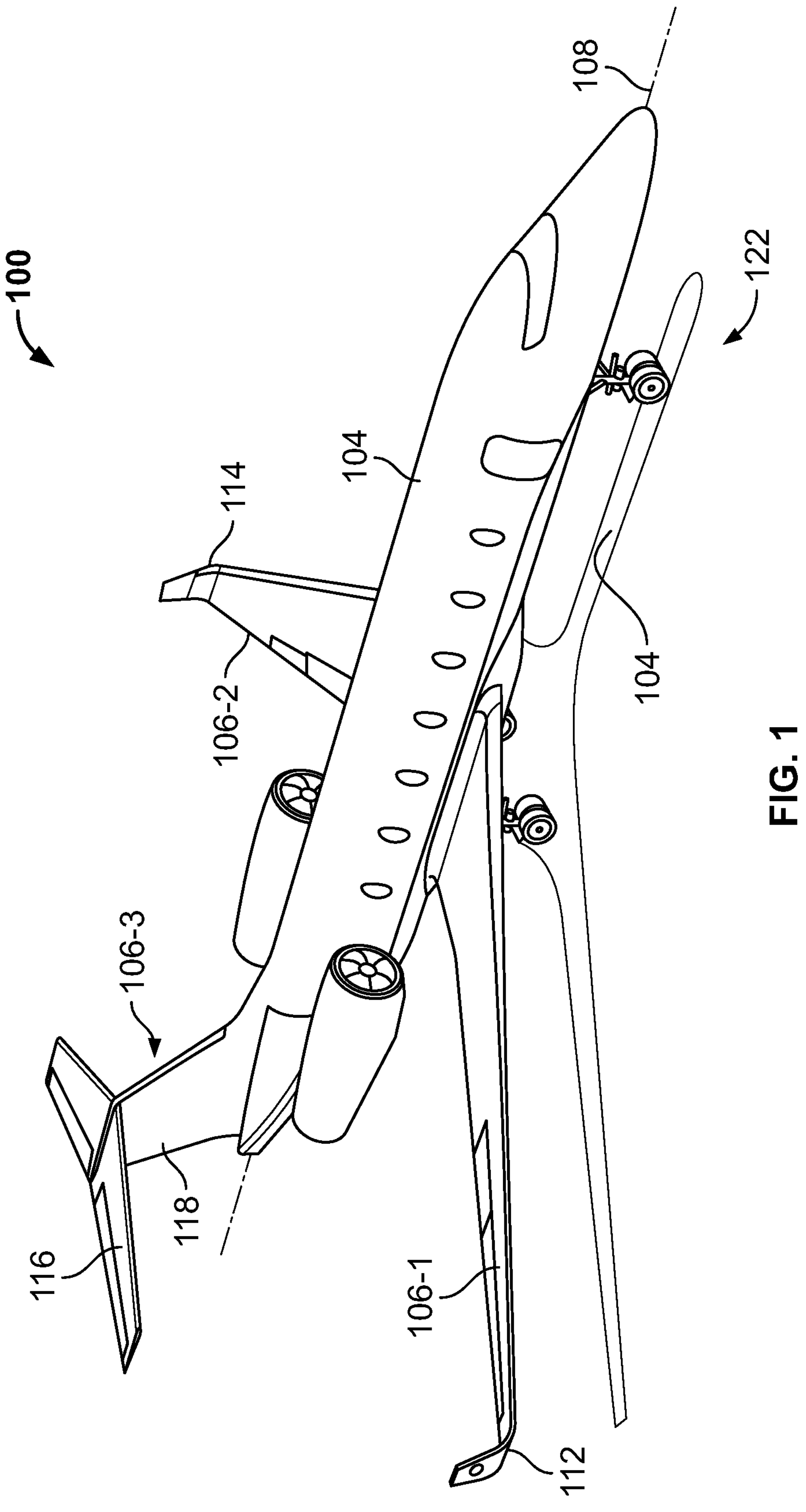
FIG. 1 depicts a plan view of one embodiment of an aircraft.

Referring first to FIG. 1, an example embodiment of an aircraft 100 is depicted. The example aircraft 100 is located on a ground surface 102 and includes a fuselage 104 and a plurality of aircraft surfaces 106. The fuselage 104 is symmetrically formed about a roll axis 108 and the aircraft surfaces 106 are each coupled to and extend from the fuselage 102. In the depicted embodiment, the plurality of aircraft surfaces 106 includes at least a first wing 106-1, which extends from the fuselage 102 to a first wingtip 112, a second wing 106-2, which extends from the fuselage 102 to a second wingtip 114, and an empennage 106-3, which includes a horizontal stabilizer 116 and a vertical stabilizer 118. It will be appreciated that other aircraft may include other aircraft surfaces.

Figure 2:
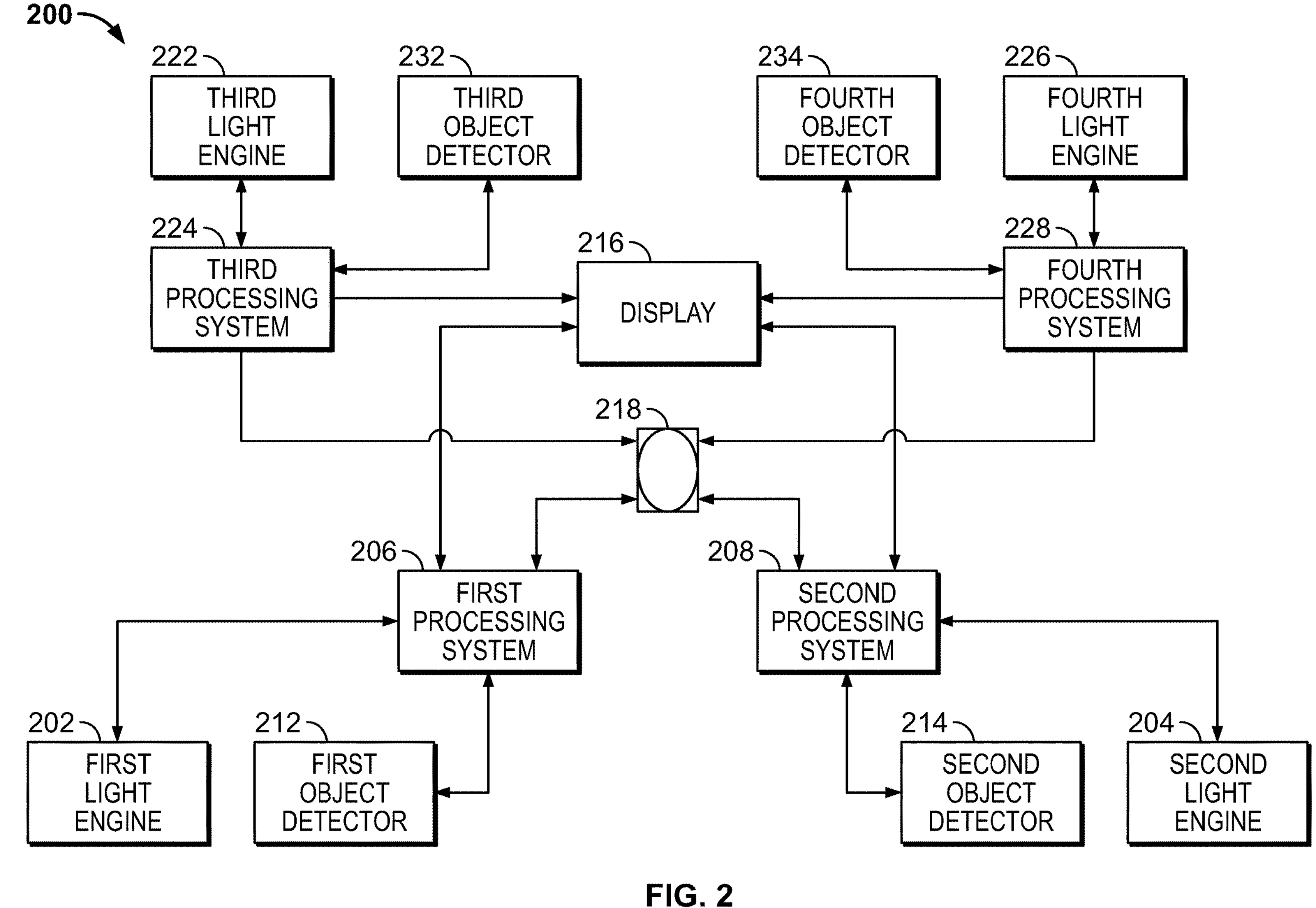
FIG. 2 depicts a functional block diagram of one embodiment of a collision avoidance system that may be implemented in the aircraft of FIG. 1.

Though not depicted in FIG. 1, the aircraft 100 is equipped with a collision avoidance system. The collision avoidance system includes at least one light engine that is mounted on at least one of the aircraft surfaces 106. Preferably, however, the collision avoidance system includes a plurality of light engines that are mounted, one each, on a plurality of the aircraft surfaces 106. A functional block diagram of one such embodiment of a collision avoidance system is depicted in FIG. 2 and will now be described.

The depicted collision avoidance system 200 includes at least a first light engine 202 and a second light engine 204. The first light engine 202 is mounted on the first wing 106-1 at least adjacent to the first wingtip 112 and is configured, upon being energized, to emit a first light beam. The second light engine 204 is mounted on the second wing 106-2 at least adjacent to the second wingtip 114 and is configured, upon being energized, to emit a second light beam.

Figure 3:
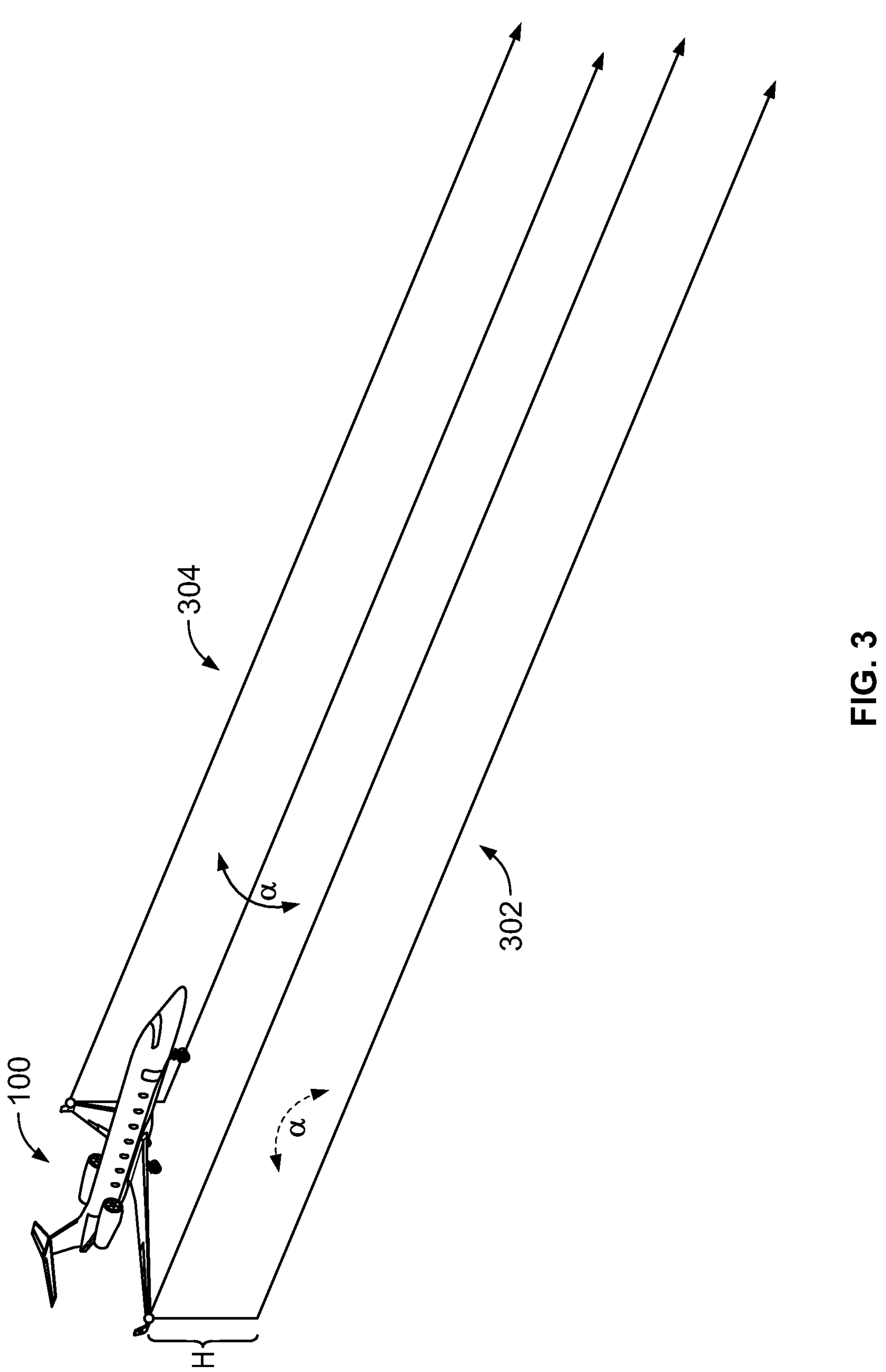
FIG. 3 depicts one example of light planes being emitted from light engines on the aircraft of FIG. 1.

More specifically, and as is shown more clearly in FIG. 3, the first light engine 202 is configured such that when the first light beam is emitted, it creates a first light plane 302 that is that is disposed at a predetermined angle (α) relative to the ground surface 104 and that extends, from the first wingtip 112, along the ground surface 104, thereby producing an elongated light pattern on the ground. The first light plane 302 may also have a constant or variable height (H). Similarly, the second light engine 204 is configured such that when the second light beam is emitted, it creates a second light plane 304 that is also disposed at the predetermined angle (α) relative to the ground surface 104 and that extends, from the second wingtip 114, along the ground surface, thereby also producing an elongated light pattern on the ground. The second light plane 304 may also have the constant or variable height (H). As may thus be appreciated, if or when the first and/or second light planes 302, 304 encounter an obstacle (not depicted), an elongated pattern will be illuminated on the obstacle. In the embodiment depicted in FIG. 3, the predetermined angle (α) is substantially 90-degrees (i.e., ±5-degrees); that is, substantially perpendicular to the ground surface 104. It will be appreciated, however, that various other angles may be implemented.

Figure 4:
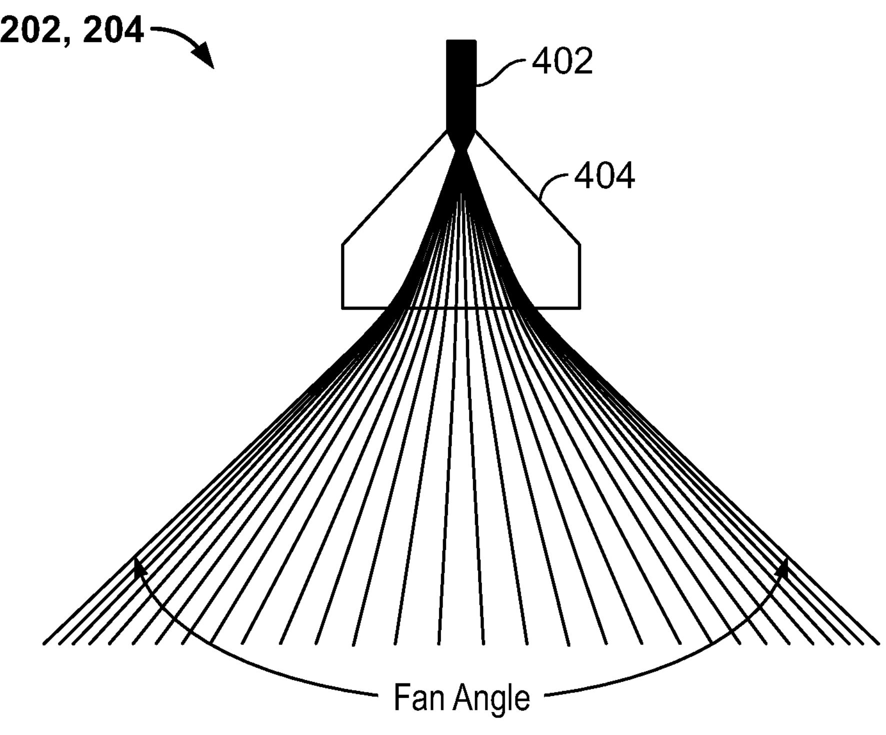
FIG. 4 depicts an example embodiment of a light engine that may be implemented in the system of FIG. 2 and that may be used to generate the light planes depicted in FIG. 3.

Turning now to FIG. 4, it is seen that, in one particular embodiment, to create the first and second light planes 302, 304, the first and second light engines 202, 204 each include a laser light source 402 and a Powell lens 404. The depicted laser light source 402 is configured, upon being energized to emit a collimated laser light beam toward the Powell lens 404. The Powell lens 404, which is also known as a laser line generating lens, creates an elongated light pattern that is a straight, uniform line (i.e., light plane) by fanning out the collimated laser light beam in one dimension. As is also generally known, and as FIG. 4 further depicts, the amount by which the collimated laser light beam is fanned out is referred to as the fan angle. It will be appreciated that in other embodiments the light source 402 may be implemented using any one of numerous types of light sources. For example, it may be implemented using one or more light emitting diodes (LEDs) just to name one example. It will additionally be appreciated that when these other light sources are used, various optical elements (e.g., lenses, reflectors, etc.) may be used to provide the equivalent of the Powell lens fan angle.

Figure 5:
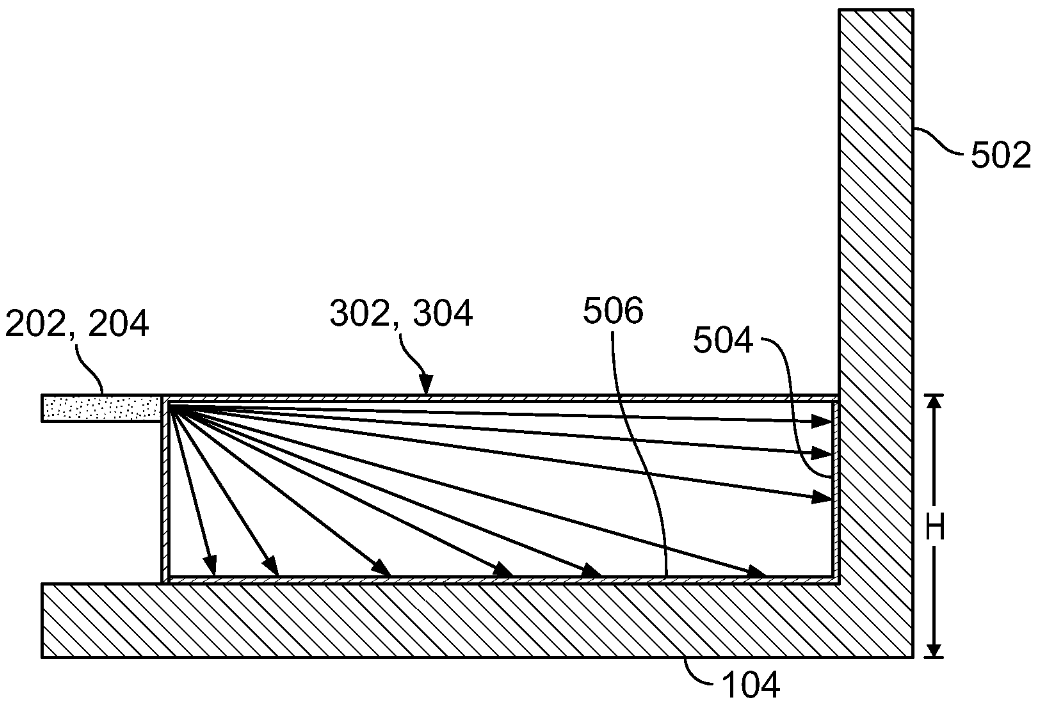
FIGS. 5-9 depict various light planes that may be emitted from light engines on the aircraft of FIG. 1.

It will be appreciated that the fan angle may vary and determines, at least in part, the constant or variable height (H) of the first and second light planes 302, 304. For example, in the embodiment depicted in FIG. 3, and as shown in simplified form in FIG. 5, when the fan angle is 90-degrees, the first and second light planes 302, 304 have a constant height (H). This figure also depicts the first and/or second light planes 302, 304 encountering an obstacle 502 ahead of the aircraft 100. As was alluded to above, when this occurs, a straight elongated pattern 504 is illuminated on the obstacle 502. As may be appreciated, and as FIG. 5 also depicts, a straight elongated pattern 506 is also illuminated on the ground surface 104.

Figure 6:
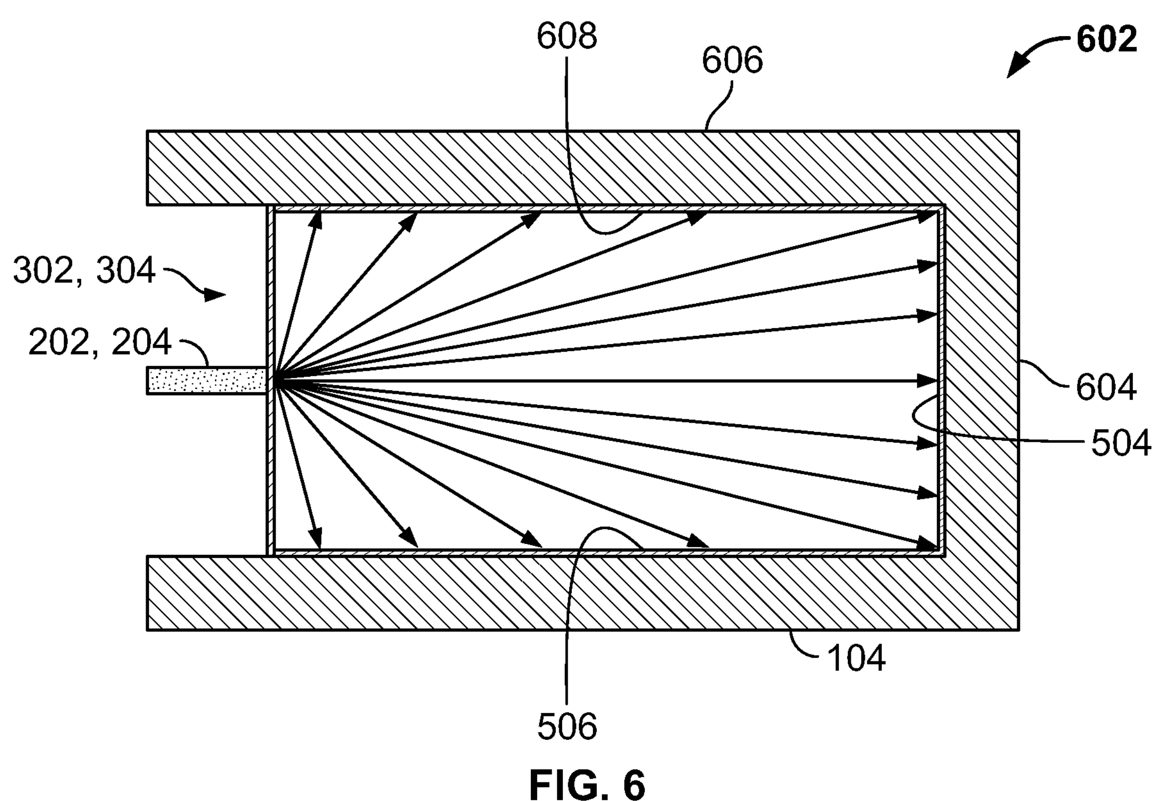

Turning now to FIG. 6, this figure illustrates, in simplified form, an embodiment in which the fan angle is 180-degrees. This figure also depicts the first and/or second light planes 302, 304 encountering an obstacle 602 that is both ahead of the aircraft 100 and extends over the aircraft 100. This may occur, for example, when obstacle is a building, such as a hangar, that has walls 604 and a roof 606, and the aircraft 100 is inside of the building. When this occurs, a straight elongated pattern 504 is illuminated on, for example, one of the walls 604 of the obstacle 602 and another line 608 on, for example, the roof 606 of the obstacle 602. Again, a straight elongated pattern 506 is also illuminated on the ground surface 104.

Figure 7:
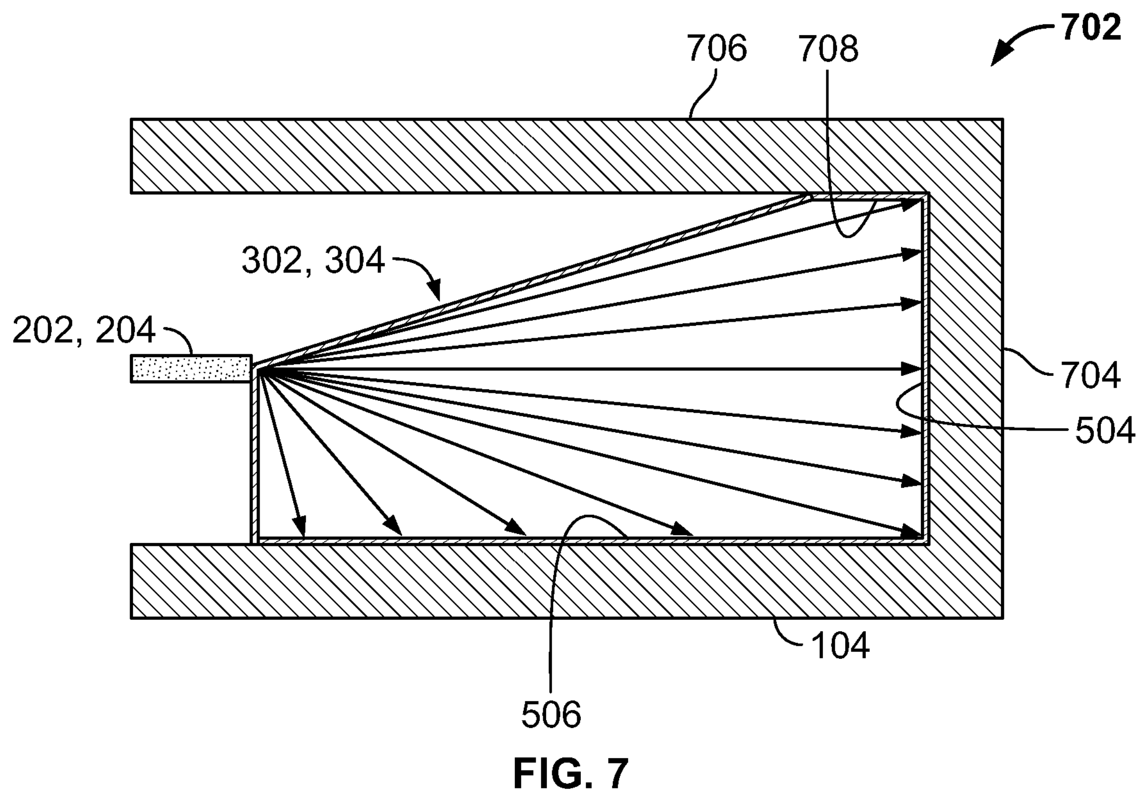

In yet other embodiments, the fan angle may be between 90-degrees and 180-degrees. One such embodiment is depicted in simplified form in FIG. 7. In this example, the fan angle is about 135-degrees. As such, the first and second light planes 302, 304 have a variable height (H). Like FIG. 6, this figure also depicts the first and/or second light planes 302, 304 encountering an obstacle 702 that is both ahead of the aircraft 100 and extends over the aircraft 100 (e.g., the aircraft 100 is inside of a hangar). When this occurs, a straight elongated pattern 504 is illuminated on, for example, one of the walls 704 of the obstacle 702 and another line 708 is illuminated on, for example, a portion of the roof 706 of the obstacle 702. Yet again, a straight elongated pattern 506 is also illuminated on the ground surface 104.

Figure 8:
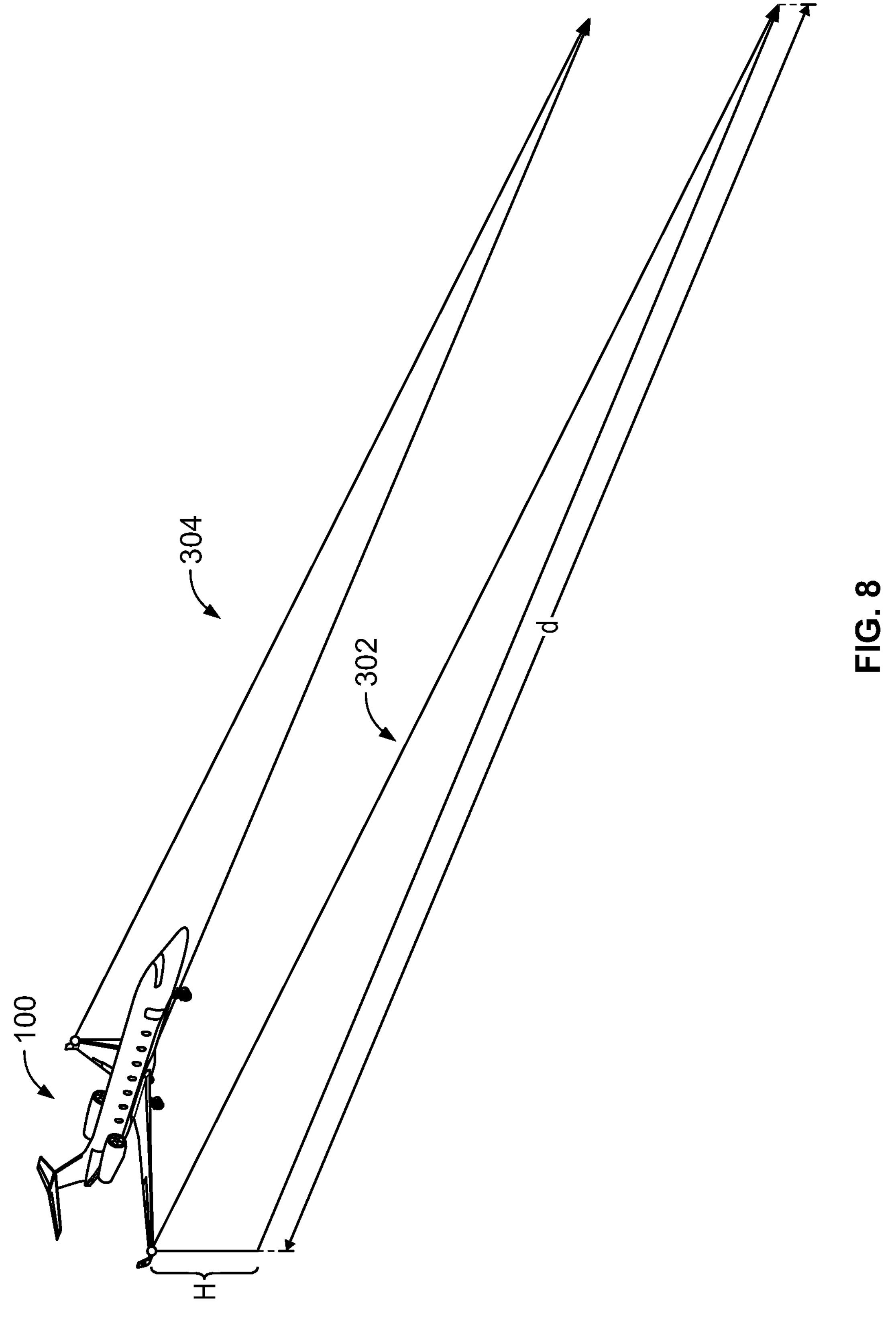
Figure 9:
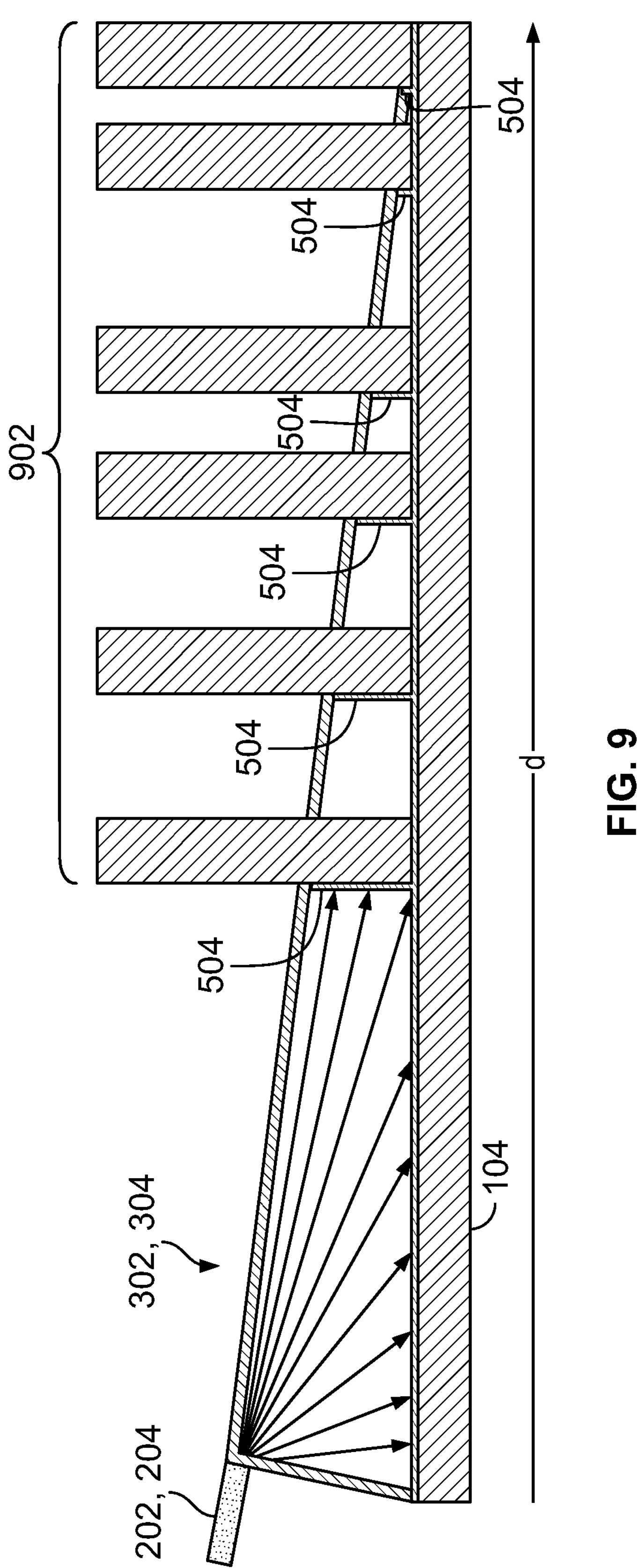

In still other embodiments, both the fan angle and the angle at which first and second the light engines 202, 204 are disposed may be varied so that the first and second light planes 302, 304 have a variable height (H) and extend along the ground surface 104 a predetermined distance (d) ahead of the aircraft 100. One such embodiment is depicted in FIGS. 8 and 9. With this embodiment, as with the previously described embodiments, when the first and/or second light planes 302, 304 encounter an obstacle 902 ahead of the aircraft 100, a straight elongated pattern 504 is illuminated on the obstacle 902. However, as is shown most clearly in FIG. 9, the straight elongated pattern extends only up to a certain height on the obstacle 902 depending on the fan angle, the angle at which the first and second light engines 202, 204 are disposed, the distance away from the first and second the light engines 202, 204, and the height at which the first and second the light engines 202, 204 are mounted.

In one example embodiment, the fan angle is 90-degrees, and the first and second light engines 202, 204 are disposed at a 30-degree angle relative to a plane that is parallel to the ground surface 104 and are mounted about 7 feet above the ground surface 104. With this configuration, the first and second light planes 302, 304 have a variable height (H) and extend along the ground about 80 feet (i.e., d=80 ft.) ahead of the aircraft 100.

Figure 10:
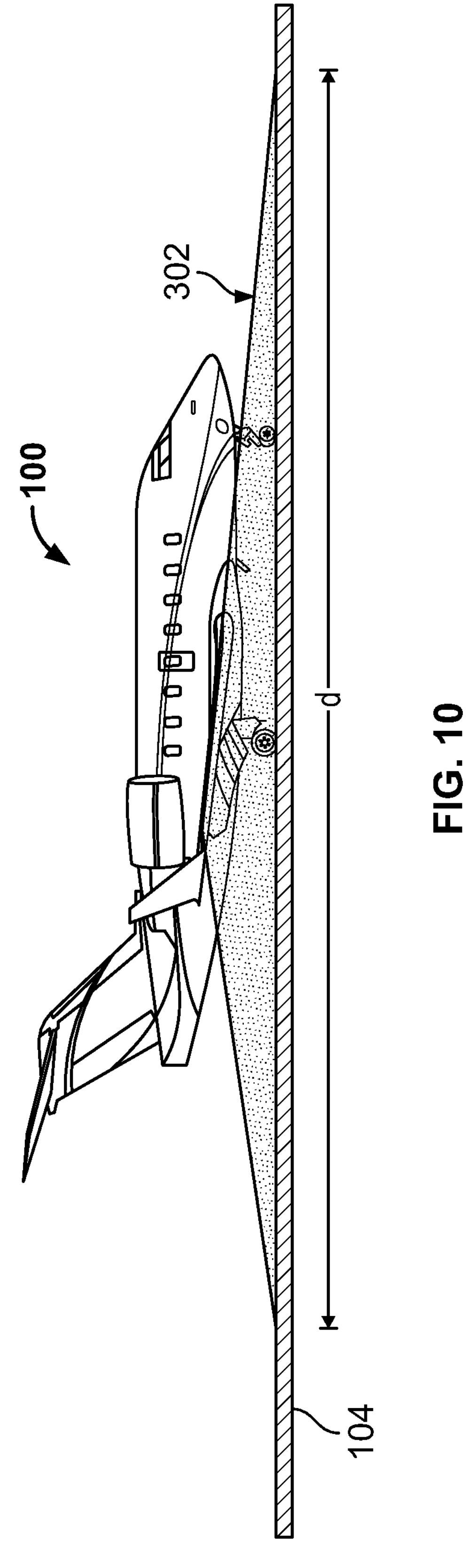
FIGS. 10-15 depict other examples of one or more light planes being emitted from light engines on the aircraft of FIG. 1.

In yet another embodiment, the fan angle and the angle at which first and second the light engines 202, 204 are disposed may be varied so that the first and second light planes 302, 304 have a variable height (H) and extend along the ground surface 104 a predetermined distance (d) both ahead of and behind the aircraft 100. One such embodiment is shown in FIGS. 10, which depicts a side view of the aircraft 100, and thus only the first light plane 302 is visible. With this embodiment, as with the previously described embodiments, when the first and/or second light planes 302, 304 encounter an obstacle ahead of or behind the aircraft 100, a straight elongated pattern will be illuminated on the obstacle. However, as described in connection with FIG. 9, the straight elongated pattern will extend only up to a certain height on the obstacle depending on the fan angle, the angle at which first and second the light engines 202, 204 are disposed, the distance away from the first and second the light engines 202, 204, and the height at which the first and second the light engines 202, 204 are mounted. In the embodiment depicted in FIG. 10, the first and/or second light planes 302, 304 are disposed substantially perpendicular to the ground surface 104.

Returning now to FIG. 2, it is seen that the depicted collision avoidance system 200 additionally includes a first processing system 206 and a second processing system 208. The first processing system 204 is in operable communication with the first light engine 202 and is configured to selectively energize the first light engine 202 to emit the first light beam. The second processing system 208 is in operable communication with the second light engine 204 and is configured to selectively energize the second light engine 204 to emit the second light beam. In one embodiment, the first and second processing systems 206, 208 are configured to energize the first and second light engines 202, 204, respectively, whenever the aircraft 100 is on the ground and moving forward. As such, the first and second processing system 206, 208 may receive an input from a sensor system, such as a weight-on-wheels sensor system and/or from another avionic system, such as a flight management system.

The first and second processing systems 206, 208 may also be configured to selectively energize the first and second light engines 202, 204, respectively, to emit the first and second light beams in a predetermined color and/or pattern. More specifically, when a collision threat is not within a predetermined distance of the aircraft 100, the first and second processing systems 206, 208 may be configured to energize the first and second light engines 202, 204, respectively, such that the first and second light beams have a first color. However, when a collision threat is within the predetermined distance of the aircraft 100, the first and second processing systems 206, 208 may be configured to energize the first and second light engines 202, 204, respectively, such that one or both of the first and second light beams have a second color. For example, when a collision threat is not within the predetermined distance of the aircraft 100, the first and second light beams may be green; however, when a collision threat is within the predetermined distance of the aircraft 100, one or both of the first and second light beams may be red, depending on whether the collision threat is for one or both wingtips 112, 114.

In addition to or instead of varying the color(s) of the first and second light beams, the first and second processing systems 206, 208 may also be configured to vary the manner in which the first and second light beams are emitted. For example, when a collision threat is not within the predetermined distance of the aircraft 100, the first and second processing systems 206, 208 may energize the first and second light engines 202, 204, respectively, such that the first and second light beams are emitted as steady, non-variable light beams. However, when a collision threat is within the predetermined distance of the aircraft 100, the first and second processing systems 206, 208 may be configured to energize the first and second light engines 202, 204, respectively, such that one or both of the first and second light beams are emitted with one or more variable characteristics, depending on whether the collision threat is for one or both wingtips 112, 114. It will be appreciated that the one or more variable characteristics may include numerous types of characteristics. To provide some non-limiting examples, the one or more variable characteristics may include at least one or more of pulse pattern, intensity, and color.

In order to know when to vary the color and/or pattern of the first and/or second light beams, it is preferable that first and second processing systems 206, 208 are additionally configured to determine when a collision threat is within the predetermined distance of the aircraft 100. To facilitate this, at least in the depicted embodiment, the collision avoidance system 200 additionally includes a first object detector 212 and a second object detector 214. It will be appreciated that the first and second object detectors 212, 214 may be implemented using any one of numerous known types of detectors. Some non-limiting examples of suitable object detectors include radar detectors and/or lidar detectors. It will additionally be appreciated that the predetermined distance that will trigger the light beams to be emitted with one or more variable characteristics may vary. In one example embodiment, the predetermined distance may be 150 feet; however, other distances may be used as needed or desired.

No matter how the first and second object detectors 212, 214 are specifically implemented or the specific predetermined distance, the first object detector 212 is coupled to the first wing 106-1 and is configured, at least in the depicted embodiment, to detect one or more objects within the predetermined distance ahead of the fuselage 102 that are at least between the first wingtip 112 and the roll axis 108. The first object detector 212 is additionally configured, upon detection of the one or more objects, to supply first object detection data to the first processing system 206. Similarly, the second object detector 214 is coupled to the second wing 106-2 and is configured, at least in the depicted embodiment, to detect one or more objects within the predetermined distance ahead of the fuselage 102 that are at least between the second wingtip 114 and the roll axis 108. The second object detector 214 is additionally configured, upon detection of the one or more objects, to supply second object detection data to the second processing system 208.

As FIG. 2 depicts, the first and second processing systems 206, 208 are in operable communication with the first and second object detectors 212, 214, respectively. As may be appreciated, the first and second processing systems 206, 208 are further configured, upon receipt of the first objection detection data and/or the second object detection data, respectively, to determine when a collision threat is within the predetermined distance of the aircraft 100.

In some embodiments, the first and second processing systems 206, 208 may additionally be configured to generate one or more alert signals when a collision threat is determined to be within the predetermined distance of the aircraft 100. The one or more alerts may be supplied, for example, to a display device 216 within the cockpit of the aircraft 100, to an audible alert generator 218, or both.

Figure 11:
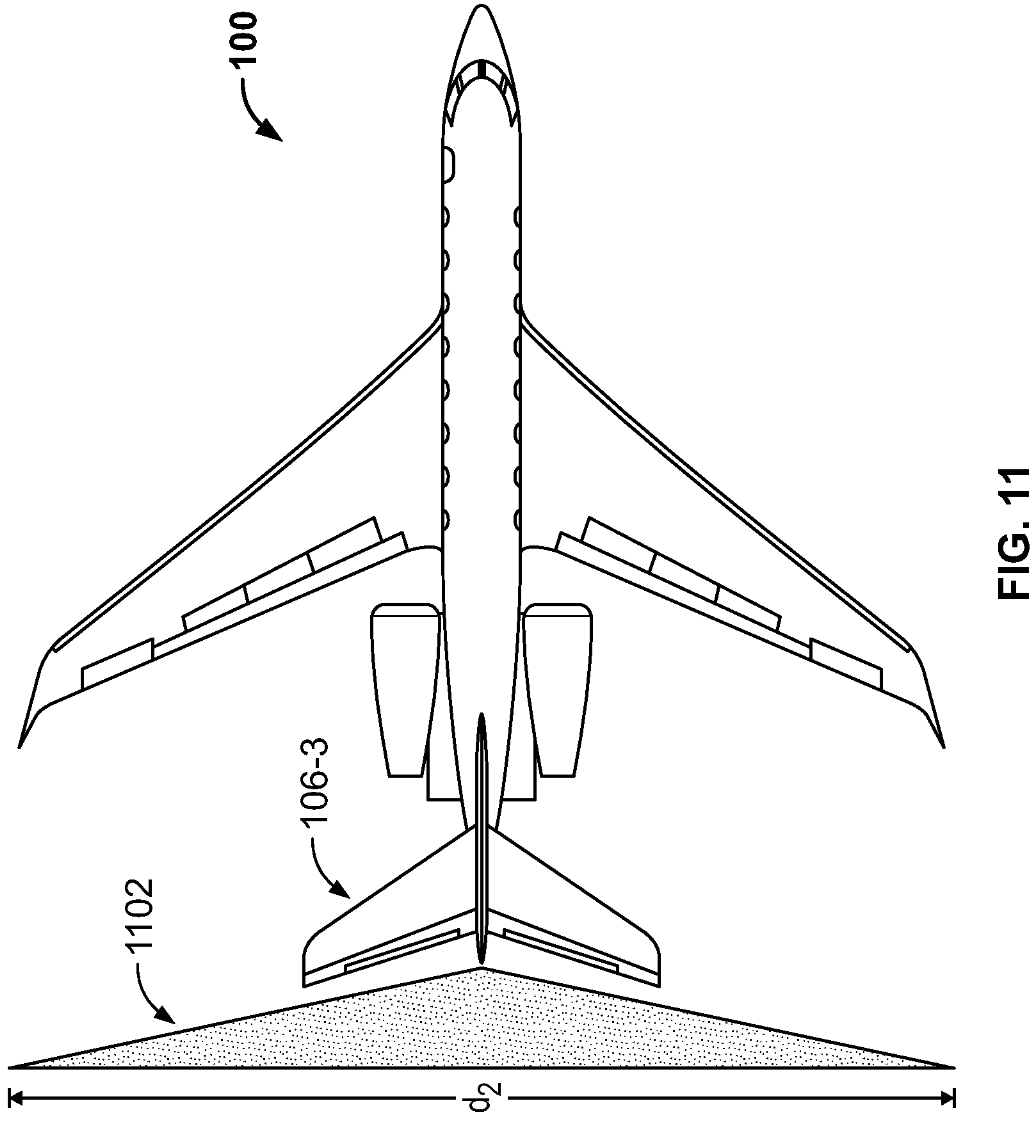

As FIG. 2 also depicts, in some embodiments, the collision avoidance system 200 may further include a third light engine 222. The third light engine 222, when included, is mounted on the empennage 106-3. Although the third light engine 222 may be mounted at any one of numerous positions on the empennage 106-3, in the depicted embodiment, as shown in FIG. 11, it is mounted on the horizontal stabilizer 116. It could, in other embodiments, be mounted on the vertical stabilizer 118.

Figure 12:
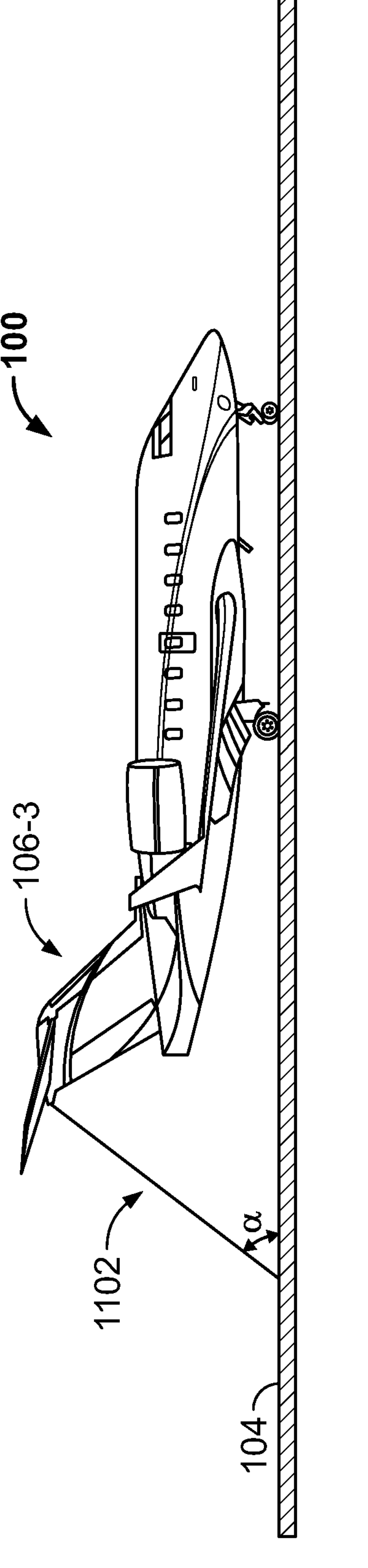

Regardless of its specific mounting location, the third light engine 222, when included, is configured, upon being energized, to emit a third light beam aft of the aircraft 100. Preferably, and as FIG. 11 depicts, the third light engine 222 is configured such that when the third light beam is emitted, it creates a third light plane 1102. The third light plane 1102 preferably, though not necessarily, has a variable height (H) and extends along the ground surface 104 aft of the aircraft 100, and to a predetermined distance ($d_3$) to the left and to the right of the roll axis 108. Moreover, as FIG. 12 depicts, the third light plane 1102 is preferably disposed at a predetermined angle ($\alpha$) relative to the ground surface 104. It will be appreciated that the predetermined angle ($\alpha$) may vary from 90-degrees to 60-degrees. It will additionally be appreciated that the third light engine 222 may be controllably energized via a third processing system 224. As FIG. 2 also depicts, the system 200 may additionally include a third object detector 232 to detect one or more objects within a predetermined distance of the empennage 106-3.

Referring quickly back to FIG. 1, is noted that the aircraft 100 additionally includes nose landing gear 122 (as well as other landing gear), which is coupled to, and is selectively extendable from, the fuselage 102. Now, referring back to FIG. 2, it is seen that in some embodiments the collision avoidance system 200 may further include a fourth light engine 226. The fourth light engine 226, when included, is mounted on the nose landing gear 122 and is configured, upon being energized, to emit a fourth light beam in a direction ahead of the aircraft 100.

Figure 13:
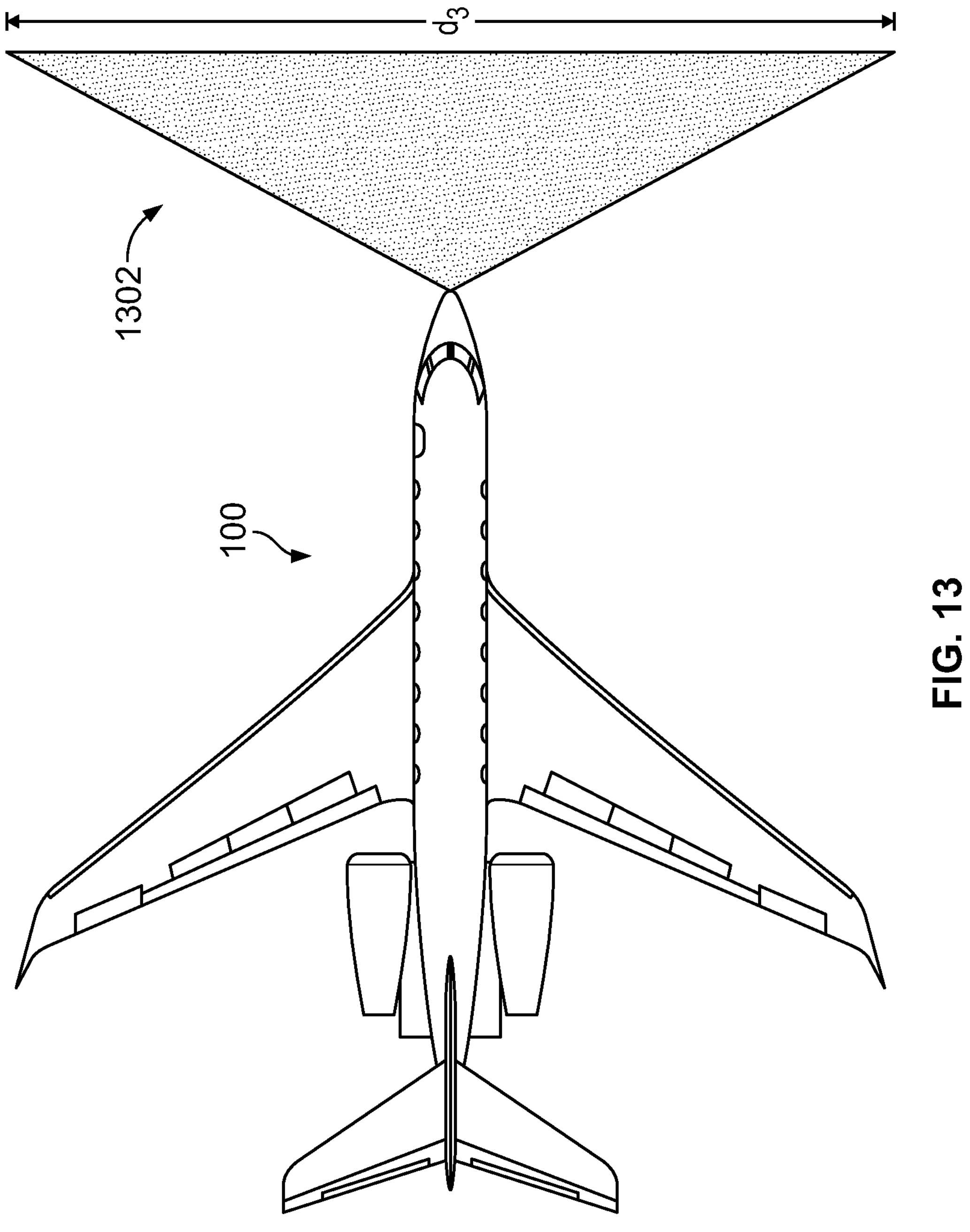
Figure 14:
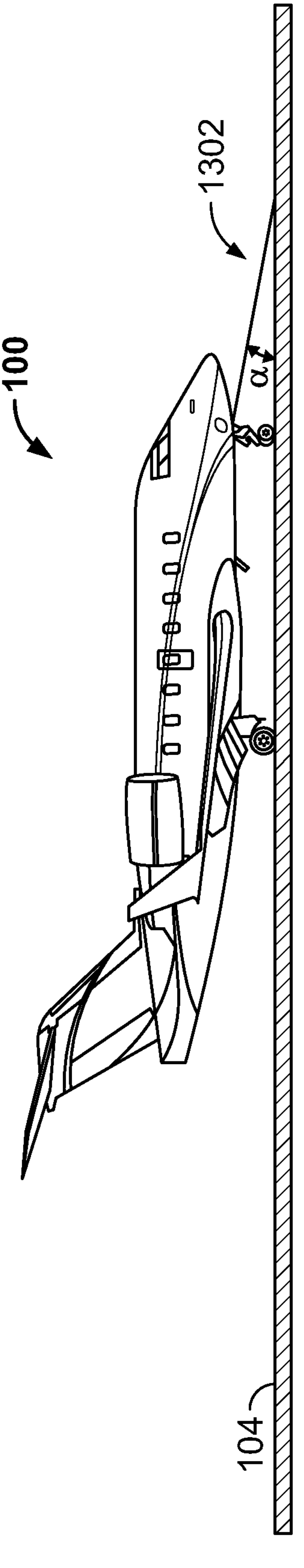

Preferably, and as FIG. 13 depicts, the fourth light engine 226 is configured such that when the fourth light beam is emitted, it creates a fourth light plane 1302. The fourth light plane 1302 preferably, though not necessarily, has a variable height (H) and extends along the ground surface 104 ahead of the aircraft 100, and to a predetermined distance ($d_3$) to the left and to the right of the roll axis 108. Moreover, as FIG. 14 depicts, the fourth light plane 1302 is preferably disposed at a predetermined angle ($\alpha$) relative to the ground surface 104. It will be appreciated that the predetermined angle ($\alpha$) may vary from, for example, about 0.5-degrees to about 2-degrees, and which may depend, for example, on the mounting height. It will additionally be appreciated that the fourth light engine 226 may be controllably energized via a fourth processing system 228. As FIG. 2 also depicts, the system 200 may additionally include a fourth object detector 234 to detect one or more objects within a predetermined distance of the nose landing gear 122.

Figure 15:
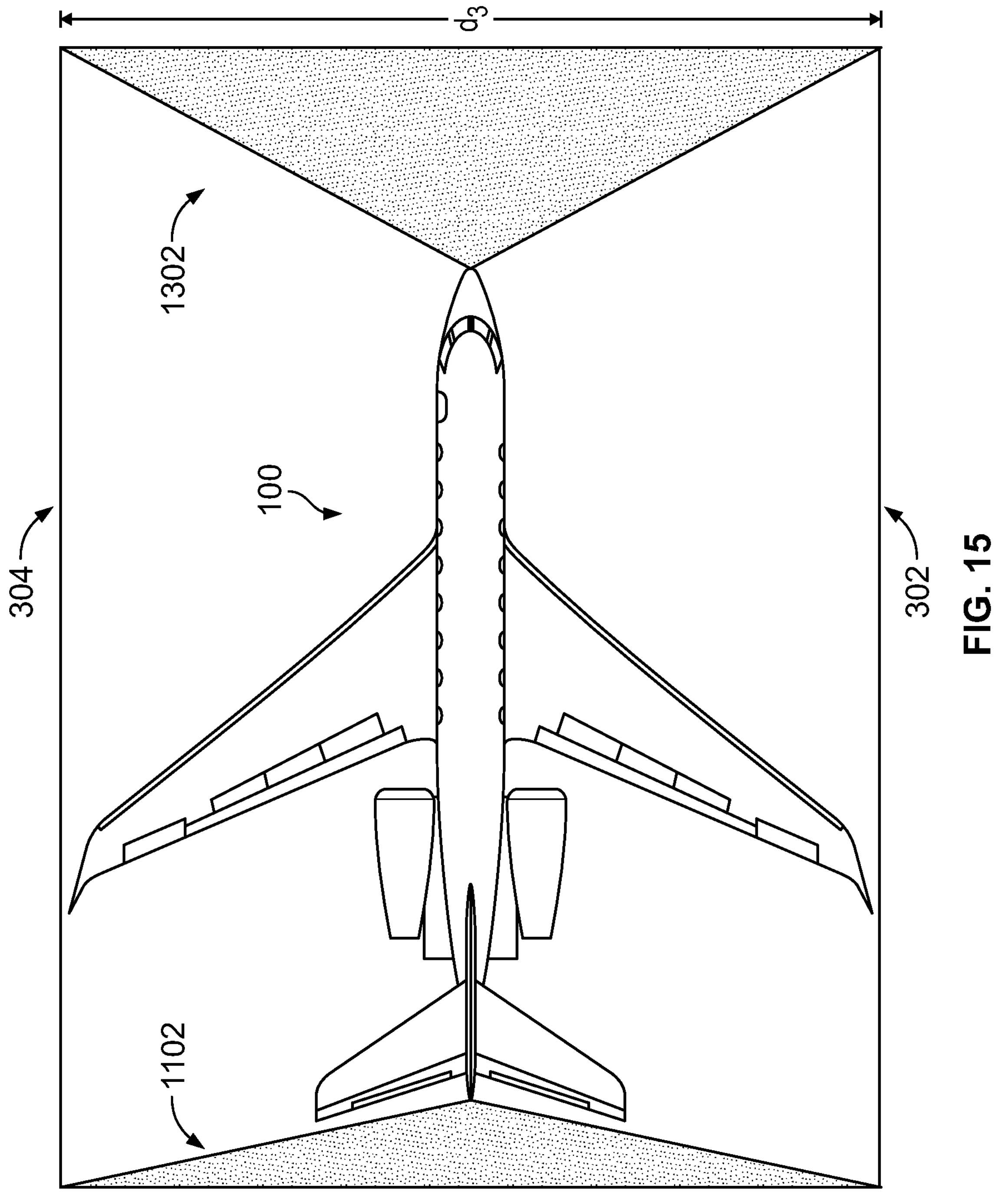

With reference now to FIG. 15, it may be seen that when the aircraft 100 is equipped with all four light engines 202, 204, 222, 226, and when all four light engines 202, 204, 222, 226 are energized, the first, second, third, and fourth light planes 302, 304, 1102, 1302 will essentially provide collision awareness in a perimeter around the aircraft 100.

Figure 16:
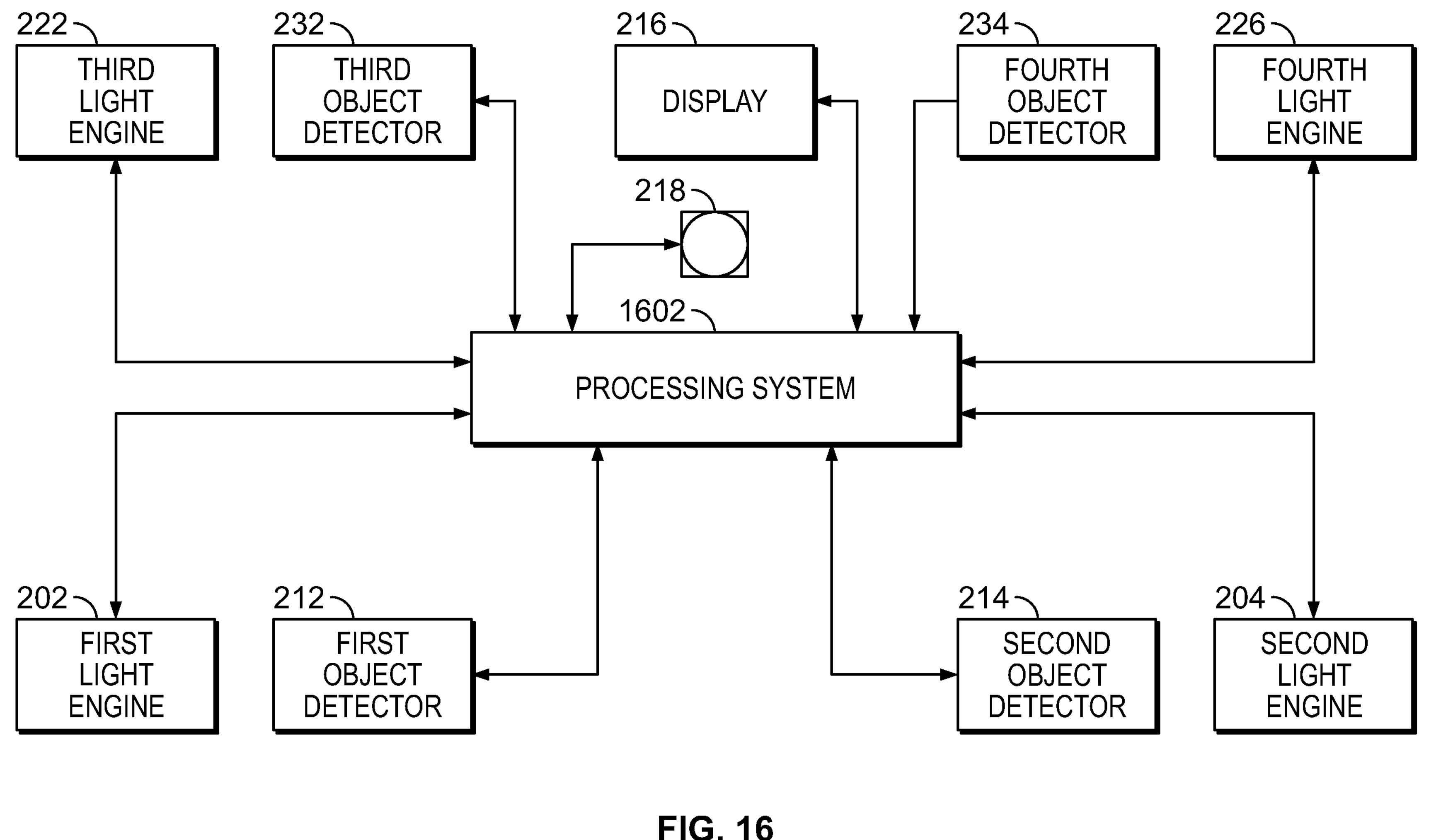
FIG. 16 depicts a functional block diagram of another embodiment of a collision avoidance system that may be implemented in the aircraft of FIG. 1.

The embodiment depicted in FIG. 2 includes independent and separate first, second, third, and fourth processing systems 206, 208, 224, 228 which are associated with the first, second, third, and fourth light engines 202, 204, 222, 226 respectively. It will be appreciated, however, that in other embodiments, the system 200 may be implemented using only a single processing system. In such embodiments, an example of which is depicted in FIG. 16, the processing system 1602 is in operable communication with the first, second, third, and fourth light engines 202, 204, 222, 226 (or however many are included), and is configured to selectively energize one or more of the first, second, third, and fourth light engines 202, 204, 222, 226 to emit the first and/or second and/or third and/or fourth light beams.

Figure 17:
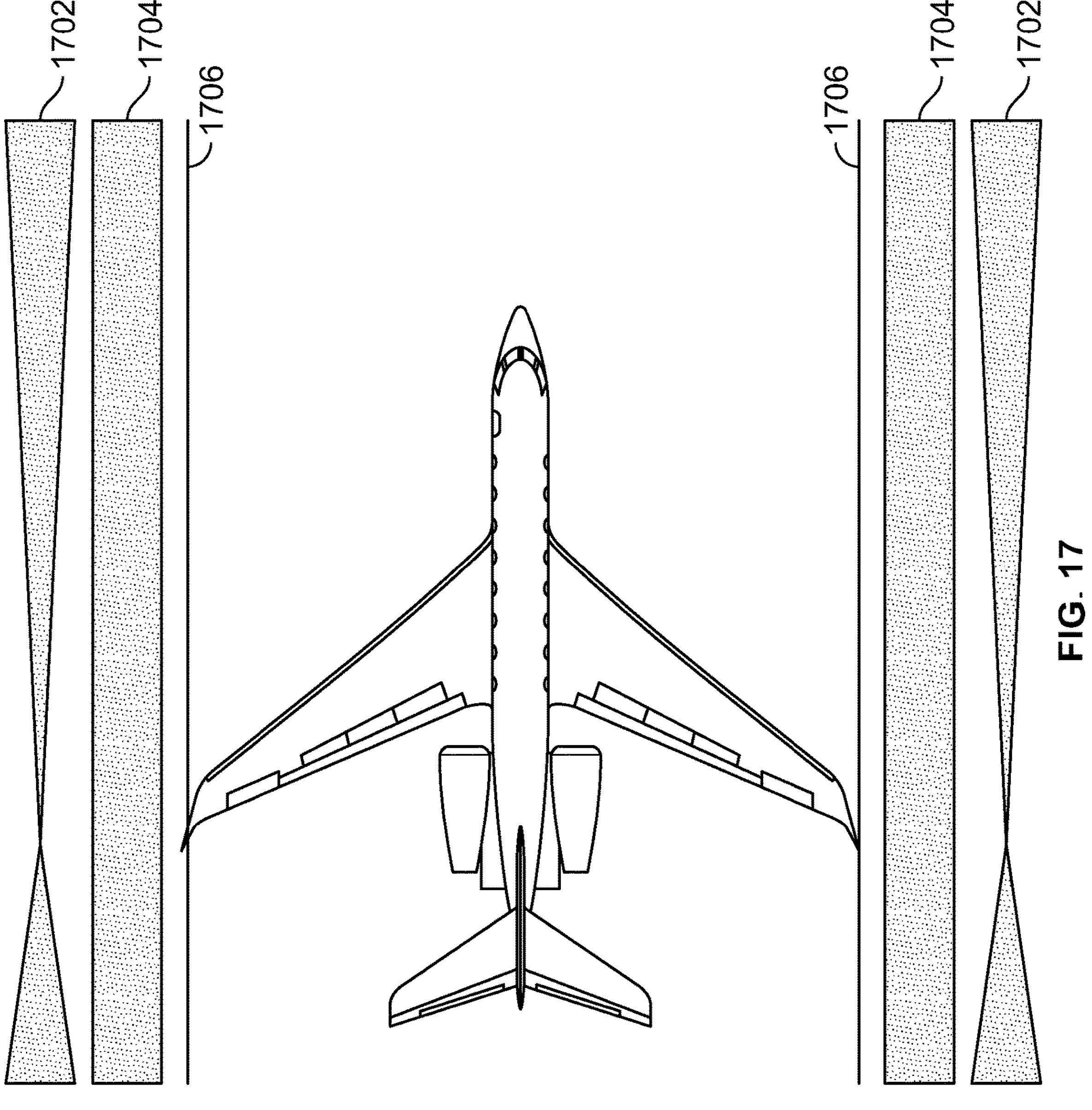
FIG. 17 depicts various example elongated light patterns that may be produced by the systems described herein.

It should be noted that in the embodiments depicted and described above, the elongated light pattern produced on the ground surface, and thus on any obstacle that the light plane encounters, is a relatively thin, straight line. It will be appreciated, however, that in other embodiments, additional optics and/or configurations could be included and arranged, using known techniques, such that the produced elongated light pattern has different shapes. For example, and as depicted in FIG. 17, some non-limiting elongated patterns that may be produced include conically shaped light patterns 1702, which may have a relatively narrow or relatively wide diverging angle, relatively wide, plane-shaped patterns 1704, or the thin, straight-line patterns 1706 described above. It should be understood, however, that various other elongated light patterns may also be used. It should also be understood that these light patterns may extend only ahead of the aircraft or both ahead of and behind the aircraft.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A collision avoidance system for an aircraft that includes a fuselage and a plurality of aircraft surfaces coupled to and extending from the fuselage, the collision avoidance system comprising:

a light engine mounted on at least one of the aircraft surfaces and configured, upon being energized, to emit a light beam in one or more directions, the light engine further configured such that, when the light beam is emitted, it creates a light plane that (i) is disposed at a predetermined angle relative to a ground surface on which the aircraft is located and (ii) extends, from the aircraft surface, along the ground surface thereby producing an elongated light pattern on the ground surface and on any obstacle that the light plane encounters; and a processing system in operable communication with the light engine, the processing system configured to:

determine when a collision threat is within a predetermined distance of the aircraft, energize the light engine such that the light beam has a first color when a collision threat is not within the predetermined distance of the aircraft, and energize the light engine such the light beam has a second color when a collision threat is within the predetermined distance of the aircraft.

2. The system of claim 1, wherein the processing system is further configured to generate one or more alert signals when a collision threat is determined to be within a predetermined distance of the aircraft.

3. The system of claim 1, wherein the light plane has either a constant height or a variable height.

4. The system of claim 1, further comprising:

an object detector coupled to the aircraft and in operable communication with the processor, the object detector configured to detect one or more collision threats within a predetermined distance of the aircraft.

5. A collision avoidance system for an aircraft that includes a fuselage and a plurality of aircraft surfaces coupled to and extending from the fuselage, the collision avoidance system comprising:

a laser light source mounted on at least one of the aircraft surfaces and configured, upon being energized, to emit a laser light beam in one or more directions, the laser light source further configured such that, when the laser light beam is emitted, it creates a laser light plane that (i) is disposed at a predetermined angle relative to a ground surface on which the aircraft is located and (ii) extends, from the aircraft surface, along the ground surface thereby producing an elongated light pattern on the ground surface and on any obstacle that the laser light plane encounters; and a processing system in operable communication with the laser light source, the processing system configured to:

determine when a collision threat is within a predetermined distance of the aircraft, energize the laser light source such that the laser light beam has a first color when a collision threat is not within the predetermined distance of the aircraft, and energize the laser light source such the laser light beam has a second color when a collision threat is within the predetermined distance of the aircraft.

6. The system of claim 5, wherein the processing system is further configured to generate one or more alert signals when a collision threat is determined to be within a predetermined distance of the aircraft.

7. The system of claim 5, wherein the laser light plane has either a constant height or a variable height.

8. The system of claim 5, further comprising:

an object detector coupled to the aircraft and in operable communication with the processor, the object detector configured to detect one or more collision threats within a predetermined distance of the aircraft.

9. A collision avoidance system for an aircraft that includes a fuselage and a plurality of aircraft surfaces coupled to and extending from the fuselage, the collision avoidance system comprising:

a light engine mounted on at least one of the aircraft surfaces and configured, upon being energized, to emit a light beam in one or more directions, the light engine further configured such that, when the light beam is emitted, it creates a light plane that (i) is disposed at a predetermined angle relative to a ground surface on which the aircraft is located and (ii) extends, from the aircraft surface, along the ground surface thereby producing an elongated light pattern on the ground surface and on any obstacle that the light plane encounters; and a processing system in operable communication with the light engine, the processing system configured to:

determine when a collision threat is within a predetermined distance of the aircraft, energize the light engine such that the light beam is emitted as steady, non-variable light beam when a collision threat is not within the predetermined distance of the aircraft, and energize the light engine such that the light beam is emitted with one or more variable characteristics when a collision threat is within the predetermined distance of the aircraft.

10. The system of claim 9, wherein the one or more variable characteristics include at least one or more of pulse pattern, intensity, and color.

11. The system of claim 9, wherein the processing system is further configured to generate one or more alert signals when a collision threat is determined to be within a predetermined distance of the aircraft.

12. The system of claim 9, wherein the light plane has either a constant height or a variable height.

13. The system of claim 9, further comprising:

an object detector coupled to the aircraft and in operable communication with the processor, the object detector configured to detect one or more collision threats within a predetermined distance of the aircraft.

14. A collision avoidance system for an aircraft that includes a fuselage and a plurality of aircraft surfaces coupled to and extending from the fuselage, the collision avoidance system comprising:

a laser light source mounted on at least one of the aircraft surfaces and configured, upon being energized, to emit a laser light beam in one or more directions, the laser light source further configured such that, when the light beam is emitted, it creates a laser light plane that (i) is disposed at a predetermined angle relative to a ground surface on which the aircraft is located and (ii) extends, from the aircraft surface, along the ground surface thereby producing an elongated light pattern on the ground surface and on any obstacle that the light plane encounters; and a processing system in operable communication with the laser light source, the processing system configured to:

determine when a collision threat is within a predetermined distance of the aircraft, energize the laser light source such that the laser light beam is emitted as steady, non-variable laser light beam when a collision threat is not within the predetermined distance of the aircraft, and energize the laser light source such that the laser light beam is emitted with one or more variable characteristics when a collision threat is within the predetermined distance of the aircraft.

15. The system of claim 14, wherein the one or more variable characteristics include at least one or more of pulse pattern, intensity, and color.

16. The system of claim 14, wherein the processing system is further configured to generate one or more alert signals when a collision threat is determined to be within a predetermined distance of the aircraft.

17. The system of claim 14, wherein the light plane has either a constant height or a variable height.

18. The system of claim 14, further comprising:

an object detector coupled to the aircraft and in operable communication with the processor, the object detector configured to detect one or more collision threats within a predetermined distance of the aircraft.

* * * * *